(12) United States Patent
Sawabe et al.

(10) Patent No.: US 11,438,246 B2
(45) Date of Patent: Sep. 6, 2022

(54) COMMUNICATION TRAFFIC ANALYZING APPARATUS, COMMUNICATION TRAFFIC ANALYZING METHOD, PROGRAM, AND RECORDING MEDIUM

(71) Applicant: NEC CORPORATION, Tokyo (JP)

(72) Inventors: Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/040,859

(22) PCT Filed: Nov. 1, 2018

(86) PCT No.: PCT/JP2018/040721
§ 371 (c)(1),
(2) Date: Sep. 23, 2020

(87) PCT Pub. No.: WO2019/187296
PCT Pub. Date: Oct. 3, 2019

(65) Prior Publication Data
US 2021/0021495 A1    Jan. 21, 2021

(30) Foreign Application Priority Data
Mar. 29, 2018 (JP) .............................. JP2018-063598

(51) Int. Cl.
*H04L 12/26* (2006.01)
*H04L 43/067* (2022.01)
(Continued)

(52) U.S. Cl.
CPC ........... *H04L 43/067* (2013.01); *G06N 7/005* (2013.01); *H04L 41/147* (2013.01); *H04L 43/026* (2013.01); *H04L 43/18* (2013.01)

(58) Field of Classification Search
CPC ... H04L 43/067; H04L 41/147; H04L 43/026; H04L 43/18; H04L 41/5067; H04L 43/0876; G06N 7/005
See application file for complete search history.

(56) References Cited

U.S. PATENT DOCUMENTS

2007/0220034 A1*  9/2007  Iyer .................... G06F 16/2465
2014/0222997 A1   8/2014  Mermoud et al.
(Continued)

FOREIGN PATENT DOCUMENTS

JP    2013-187629 A    9/2013
JP    2015-050473 A    3/2015
(Continued)

OTHER PUBLICATIONS

Anan Sawabe et al., "Identification of Applications on Smartphone by Encrypted Traffic Analysis", IEICE Technical Report, Dec. 7, 2017, pp. 1-6, vol. 117, No. 351.
(Continued)

*Primary Examiner* — Gil H. Lee
*Assistant Examiner* — Juan C Turriate Gastulo
(74) *Attorney, Agent, or Firm* — Sughrue Mion, PLLC

(57) ABSTRACT

To realize real-time estimation when estimating the type and state of an application from time-series data of communication traffic. A communication traffic analyzing apparatus of the present invention has a state transition model generating unit configured to generate a probabilistic state transition model from time-series data of communication traffic, at each predetermined timing, a state transition model update unit configured to update a state transition model when a difference between the state transition models at two timings generated by the state transition model generating unit is greater than or equal to a predetermined difference and a communication state of network satisfies a predeter-
(Continued)

mined condition, and an application type and state estimating unit configured to estimate a type and a state of an application using the updated state transition model.

8 Claims, 10 Drawing Sheets

(51) Int. Cl.
*G06N 7/00* (2006.01)
*H04L 41/147* (2022.01)
*H04L 43/026* (2022.01)
*H04L 43/18* (2022.01)

(56) References Cited

U.S. PATENT DOCUMENTS

| | | | |
|---|---|---|---|
| 2015/0063113 A1* | 3/2015 | Yoshida | H04L 45/38 370/235 |
| 2015/0161518 A1 | 6/2015 | McCann | |
| 2016/0283566 A1* | 9/2016 | Singh | G06F 16/248 |
| 2018/0288081 A1* | 10/2018 | Yermakov | H04L 41/142 |
| 2018/0337832 A1* | 11/2018 | Yamashita | H04L 41/145 |
| 2019/0303783 A1* | 10/2019 | Utsumi | G06Q 10/04 |
| 2020/0226433 A1* | 7/2020 | Zeng | G06N 7/005 |

FOREIGN PATENT DOCUMENTS

| | | |
|---|---|---|
| JP | 2015-050714 A | 3/2015 |
| JP | 2016-046669 A | 4/2016 |
| JP | 2017-139580 A | 8/2017 |
| WO | 2011/158421 A1 | 12/2011 |
| WO | 2015/085102 A1 | 6/2015 |

OTHER PUBLICATIONS

International Search Report for PCT/JP2018/040721, dated Jan. 22, 2019.
Japanese Office Communication for JP Application No. 2021-122255 dated May 24, 2022 with English Translation.

* cited by examiner

COMMUNICATION TRAFFIC ANALYZING APPARATUS, COMMUNICATION TRAFFIC ANALYZING METHOD, PROGRAM, AND RECORDING MEDIUM

This application is a National Stage of International Application No. PCT/JP2018/040721 filed Nov. 1, 2018, claiming priority based on Japanese Patent Application No. 2018-063598 filed Mar. 29, 2018.

BACKGROUND

Technical Field

The present invention relates to communication traffic analyzing apparatus, a communication traffic analyzing method, a program and a recording medium.

Background Art

Along with the enhancement of communication services, the performance indicator (for example, key performance indicator (KPI)) of communication carriers has been shifting from, for example, the quality of communication (the quality of service (QoS)) to the quality of applications for people and things (for example, the quality of experience (QoE), the quality of control (QoC), etc.). To give one example, in International Telecommunication Union Telecommunication Standardization Sector (ITU-T), the QoE for web-browsing/video has been designed (Recommendation ITU-T G.1031).

It is expected that network control and network design based on the quality of applications will be valued in the future. For example, regarding the quality of applications for people, the QoE for web access (ITU-T Recommendation G.1030: Estimating end-to-end performance in IP networks for data applications) and the QoE for video streaming (Recommendation ITU-T P.1203: Parametric bitstream-based quality assessment of progressive download and adaptive audiovisual streaming services over reliable transport) are defined by ITU-T. Regarding the quality of applications for things, research is in progress on control over networks (network system) in the field of machine control. For example, discussions on performance indicators for machine control over networks are expected to go on (the quality of performance (QoP), the quality of control (QoC), etc.).

In recent years, for example, with the spread of the Internet of things (IoT) and the like, in which things are connected to the Internet, there have been increasing needs for the quality of communication on the communication users' side. For example, in IoT or the like (and also in applications other than IoT), the operating state of applications might change. For example, there may be an IoT application, in which video data that is captured by an IoT sensor camera (in-vehicle camera, etc.) is transmitted to the server (cloud) or the like via a network, together with, for example, navigation data, and in which, on the server side, received data is analyzed on a real time basis, and remote control, remote support (for example, self-driving and driving assistance) and so forth are provided based on results of analysis, and, in this application, video streaming (real-time video streaming) may be provided according to the variation of network throughput and so forth. Also, assuming an object recognition application using a wearable camera or the like, when the server to receive the video data from the wearable camera and the wearable camera work together to carry out object recognition, and when the wearable camera alone tracks the target object, the required throughput is different. Furthermore, assuming that a drone equipped with a camera is used as an IoT device and aerial images captured by the camera are relayed on a real time basis, whether video streaming is sent from the drone, the drone's flight information (location, altitude, acceleration, etc.) is transmitted, or the drone is configured with commands and so on, the required throughput varies in each mode of operation. Note that, in a network (for example, a wireless network, a core network, a wide area network (WAN), etc.), a variety of communication traffic, including e-mails, still images, video (movie), and voice (call) flow over the same network, for example, but it is well known that these types of communication traffic show different characteristics for each communication service.

Also, Patent Literature 1 discloses model identification apparatus that identifies a mathematical model for estimating the behavior of packets. In Patent Literature 1, a hidden Markov model is used for a mathematical model.

CITATION LIST

Non-Patent Literature

[PTL 1] WO 2011/158421

SUMMARY

Technical Problem

To allow communication carriers to provide "optimal communication quality based on conditions of use (the type and state of an application) that change from time to time" and improve the satisfaction (the quality of experience (QoE)) of communication users, smooth and flawless communication control is needed.

However, network devices that constitute the aforementioned network provided by the communication carriers have no way of directly knowing what application a communication user (for example, a terminal) is using, and in what state the application is running.

Furthermore, when estimating an application's type and state from time-series data of communication traffic by using models, prior art does not take into account the processing time, and this makes real-time estimation based on time-series data of observed communication traffic difficult.

It is therefore an example object of the present invention to realize real-time estimation when estimating the type and state of an application from time-series data of communication traffic.

Solution to Problem

According to one aspect of the present invention, a communication traffic analyzing apparatus includes: a state transition model generating unit configured to generate a probabilistic state transition model from time series data of communication traffic, at each predetermined timing; a state transition model update unit configured to update a state transition model when a difference between the state transition models at two timings generated by the state transition model generating unit is greater than or equal to a predetermined difference and a communication state of network satisfies a predetermined condition; and an application type and state estimating unit configured to estimate a type and a state of an application using the updated state transition model.

According to one aspect of the present invention, a communication traffic analyzing method includes: generating a probabilistic state transition model from time series data of communication traffic, at each predetermined timing; updating a state transition model when a difference between the generated state transition models at two timings is greater than or equal to a predetermined difference and a communication state of network satisfies a predetermined condition; and estimating a type and a state of an application using the updated state transition model.

According to one aspect of the present invention, a program causes a processor to: generate a probabilistic state transition model from time series data of communication traffic, at each predetermined timing; update a state transition model when a difference between the generated state transition models at two timings is greater than or equal to a predetermined difference and a communication state of network satisfies a predetermined condition; and estimate a type and a state of an application using the updated state transition model.

According to one aspect of the present invention, a recording medium is a non-transitory computer readable recording medium storing a program that causes a processor to: generate a probabilistic state transition model from time series data of communication traffic, at each predetermined timing; update a state transition model when a difference between the generated state transition models at two timings is greater than or equal to a predetermined difference and a communication state of network satisfies a predetermined condition; and estimate a type and a state of an application using the updated state transition model.

Advantageous Effects of Invention

According to the present invention, it is possible to realize real-time estimation when estimating the type and state of an application from time-series data of communication traffic. Note that, according to the present invention, instead of or together with the above advantageous effects, other advantageous effects may be brought about.

DESCRIPTION OF THE EXAMPLE EMBODIMENTS

Figure 1:
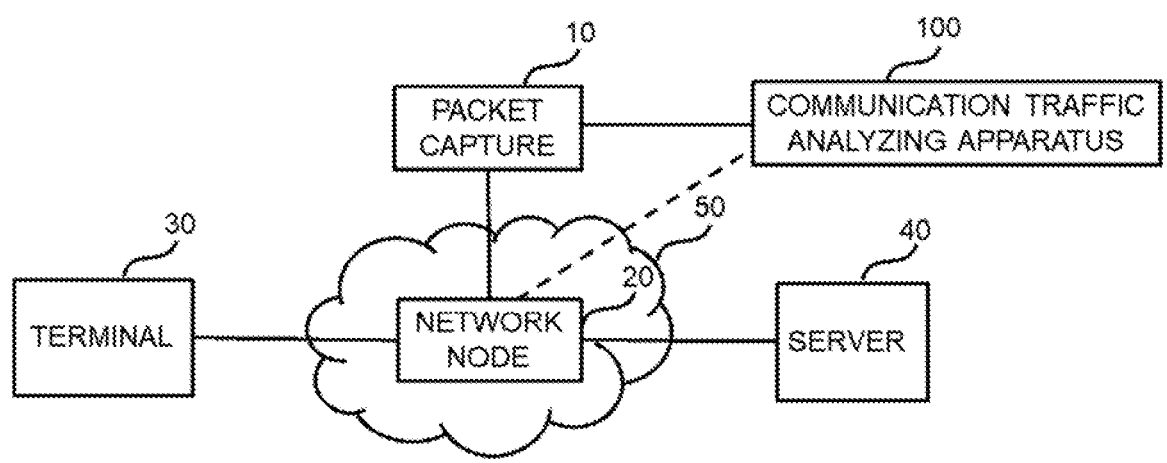
FIG. 1 is a diagram to explain an example schematic configuration of a system 1 according to a first example embodiment of the present invention.

Hereinafter, example embodiments of the present invention will be described in detail with reference to the accompanying drawings.

Note that, in the Specification and drawings, elements that can be described in the same or similar terms will be assigned the same reference signs, and overlapping description may be omitted.

The description will be given in the following order:
1. Related Technology
2. Summary of Example Embodiments of the Present Invention
3. Configuration of System According to Example Embodiments of the Present Invention
4. First Example Embodiment
   4.1. Configuration of Communication Traffic Analyzing Apparatus
   4.2. Technical Features
   4.3. Summary
5. Second Example Embodiment
   5.1. Configuration of Communication Traffic Analyzing Apparatus
   5.2. Technical Features
   5.3. Summary
6. Third Example Embodiment
   6.1. Configuration of Communication Traffic Analyzing Apparatus
   6.2. Technical Features
   6.3. Summary
7. Example Alteration of Each Example Embodiment
8. Other Example Embodiments

1. RELATED TECHNOLOGY

Under the background surrounding communication services as described above, future communication carriers will be required to:
   meet increasing needs for communication quality by communication users;
   provide communication to meet application-specific requirements; and
   provide communication services according to the status of the use of applications, which changes from time to time. Therefore, the communication carriers' task is to keep track of changes in the type and state of applications.

To allow communication carriers to provide "optimal communication quality based on conditions of use (the type and state of an application) that change from time to time" and improve the satisfaction (the quality of experience (QoE)) of communication users, smooth and flawless communication control is needed. In this case, for example, the following problems also exist:
   increase in the number of parameters to be controlled (communication band, fluctuation of transmission delay (jittering), etc.); and
   short control cycle.

However, the information which the communication carriers (network devices provided by the communication carriers) can acquire is limited. For example, the technique of deep packet inspection (DPI), which allows looking into the contents of communication traffic, has its limit due to the increase in encrypted communication traffic that flows through the network and the diversification of communication traffic. Also, from the perspective of personal information protection law, there is a possibility that DPI will be banned altogether. From the perspective of encryption and privacy, the contents of communication data cannot be seen.

The information that can be acquired is 5-tuple (for example, source/destination internet protocol (IP)) addresses/ports, and protocol) and communication traffic patterns (for example, throughput, packet size, packet transmission interval, etc.).

A flow of communication traffic is comprised of a group of packets carrying the same information in the IP header field (a set of packets with the same destination IP address and port number and the same source IP address and port number). The IP header field contains the source address of communication traffic, the destination address of communication traffic, the source port, the destination port, and the protocol number. In IPQoS, these fields are referred to as "5-tuple".

Network devices that constitute the aforementioned network provided by the communication carriers have no way of directly knowing what application a communication user (for example, a terminal) is using, and in what state the application is running.

So, according to related technology 1, time-series data of communication traffic, observed in a probabilistic state transition model (where the probabilistic state transition model refers to, for example, a hidden Markov model) of a layered structure, is modeled, and the type and state of an application are estimated, so that it is possible to prevent false detection of the type and state of the application even in an environment in which there are a time-series of changes, such as variation of the bandwidth that is available for the communication network.

In order to enable communication control that is suitable for the type and state of an application, it is important to estimate the type and state of the application on a real time basis. According to related technology 1, time-series data of communication traffic in a certain length of period is analyzed based on a batch process, the parameters of a layered probabilistic state transition model are learned, and the type and state of an application with respect to the time-series data of the communication traffic in the period used for learning are estimated.

2. SUMMARY OF EXAMPLE EMBODIMENTS OF THE PRESENT INVENTION (1) Technical Issues Learning of parameters for a state transition model such as a hidden Markov model requires a predetermined period of learning time. Therefore, when a method of generating a probabilistic state transition model after time-series data of communication traffic in a certain length of period is accumulated, and estimating the type and state of the application in that certain length of period is used, the type and state of the application can be estimated only after the analysis processing time has passed, and it is therefore difficult to estimate the type and state of the application on a real time basis.

When estimating an application's type and state from the time-series data of communication traffic, prior art does not take into account the processing time, and this makes real-time estimation based on the time-series data of observed communication traffic difficult.

It is therefore an example object of the present invention to realize real-time estimation when estimating the type and state of an application from time-series data of communication traffic.

According to an example embodiment of the present invention, a communication traffic analyzing apparatus includes, for example, a state transition model generating unit configured to generate a probabilistic state transition model from time series data of communication traffic, at each predetermined timing, a state transition model update unit configured to update a state transition model when a difference between the state transition models at two timings generated by the state transition model generating unit is greater than or equal to a predetermined difference and a communication state of network satisfies a predetermined condition, and an application type and state estimating unit configured to estimate a type and a state of an application using the updated state transition model.

By this means, it is possible to realize real-time estimation when, for example, estimating the type and state of an application from time-series data of communication traffic.

Note that the above-described technical feature is one specific example of an example embodiment of the present invention, and, obviously, example embodiments of the present invention are by no means limited to the above-described technical feature.

3. CONFIGURATION OF SYSTEM ACCORDING TO EXAMPLE EMBODIMENTS OF THE PRESENT INVENTION

FIG. 1 is a diagram to explain an example schematic configuration of a system 1 according to each example embodiment of the present invention.

The system 1 includes a packet capture 10, a network node 20 that constitutes a communication network 50, terminal apparatus 30, a server 40, and communication traffic analyzing apparatus 100.

The packet capture 10 captures packets, which are protocol data units (PDUs) that flow in the communication network 50. The packet capture 10 analyzes the header of each packet, and analyzes, for example, each packet's source address, destination address, port and packet size, the number of packets per unit time, the packet transmission time interval, and so on. The packet capture 10 is connected to the network node 20 (for example, relaying apparatus such as a router) or the like deployed in the communication network 50, and captures the packets that flow on the communication network 50 (for example, packets that are transmitted and received between the terminal apparatus 30 and the server 40).

The network node 20 may be a gateway node in the core network, or may be a base station of a radio access network, or the like.

The terminal apparatus 30 may, for example, transmit and receive packets to and from the server 40 via the network node 20. Also, the terminal apparatus 30 may transmit and receive packets to and from other terminal apparatus 30 via the network node 20. The server 40 may, for example, transmit and receive packets to and from other transmission apparatus 30 via the network node 20. Although FIG. 1 shows one network node 20, one terminal apparatus 30, and one server 40, and two or more of each may be provided.

The communication traffic analyzing apparatus 100 acquires the time-series data of communication traffic (throughput) between the terminal apparatus 30 and the server 40, or between a plurality of terminal apparatus 30, calculated by the packet capture 10, and analyzes the traffic. The communication traffic analyzing apparatus 100 may be implemented on a cloud server or the like (not shown) that is connected via the communication network 50.

4. 1 FIRST EXAMPLE EMBODIMENT

<4.1. Configuration of Communication Traffic Analyzing Apparatus>

Figure 2:
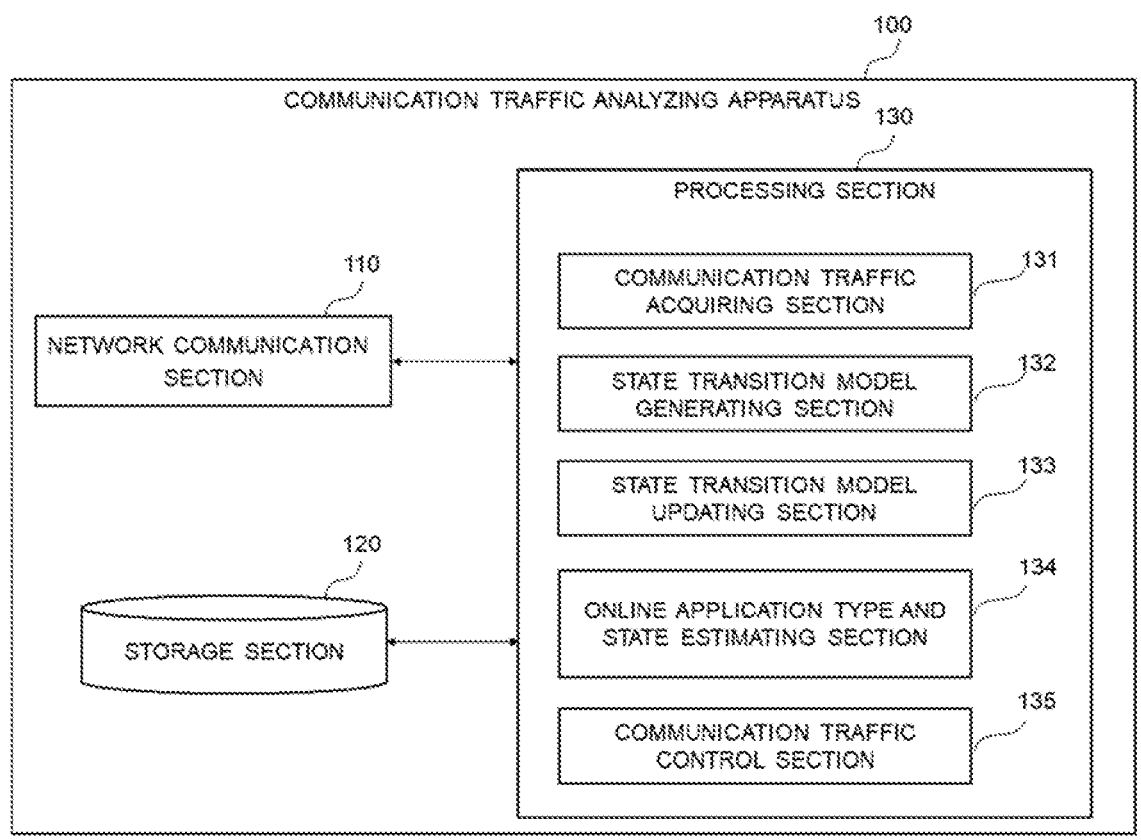
FIG. 2 is a block diagram to show an example configuration of communication traffic analyzing apparatus according to the first example embodiment.

First, an example configuration of the communication traffic analyzing apparatus 100 according to the first example embodiment will be described below with reference to FIG. 2. FIG. 2 is a block diagram to show an example configuration of communication traffic analyzing apparatus 100 according to the first example embodiment. Referring to FIG. 2, the communication traffic analyzing apparatus 100 includes a network communication section 110, a storage section 120, and a processing section 130. The communication traffic analyzing apparatus 100 is configured to calculate, probabilistically, the transition of the type and state of an application that are estimated from the variation of the waveform (the frequency of variation, the magnitude of variation, etc.) of time-series data of communication traffic.

(1) Network Communication Section 110

The network communication section 110 receives signals from the network, and transmits signals to the network.

(2) Storage Section 120

The storage section 120 stores, temporarily or permanently, programs and parameters for the operation of the communication traffic analyzing apparatus 100, and a variety of data.

(3) Processing Section 130

The processing section 130 provides a variety of functions of the communication traffic analyzing apparatus 100. The processing section 130 includes a communication traffic acquiring section 131, a state transition model generating section 132, a state transition model updating section 133, an online application type and state estimating section 134, and a communication traffic control section 135. Note that the processing section 130 may further include components other than these components. That is, the processing section 130 may perform operations other than those of these components. For example, the processing section 130 (communication processing section not shown) may communicate with other nodes via the network communication section 210. Specific operations of the communication traffic acquiring section 131, the state transition model generating section 132, the state transition model updating section 133, the online application type and state estimating section 134, and the communication traffic control section 135 will be described in detail later.

(4) Communication Traffic Acquiring Section 131

The communication traffic acquiring section 131 acquires the communication traffic to be analyzed from the packet capture 10 on a real time basis. Which communication traffic is subject to analysis can be determined in advance.

(5) State Transition Model Generating Section 132

The state transition model generating section 132 generates state transition models for probabilistically estimating the type and state of an application from the variation of the waveform of time-series data of communication traffic. For example, the state transition model generating section 132 generates probabilistic state transition models, from time-series data of communication traffic, per predetermined timing. As for the method of generating state transition models, a known method can be used.

(6) State Transition Model Updating Section 133

The state transition model updating section 133 determines the timing for updating the parameters of the state transition models for use in the online application type and the state estimation section 134. Note that the parameters of the state transition models are generated in the state transition model generating section 132. For example, if the difference between state transition models generated by the state transition model generating section 132 with respect to two timings is greater than or equal to a predetermined difference and the communication state of the network satisfies a predetermined condition (for example, having little impact on communication control), the state transition model updating section 133 updates one state transition model corresponding to the older timing with the other state transition model corresponding to the newer timing. The state transition model updating section 133 is one feature of this example embodiment. The details of its operation will be described in the following description of the operation.

(7) Online Application Type and State Estimating Section 134

The online application type and state estimating section 134 analyzes the communication traffic observed in the communication traffic acquiring section 131, on a real time basis, and estimates the type and state of the application at observed timings. For example, the online application type and state estimating section 134 estimates the type and state of an application by using the state transition model updated in the state transition model updating section 133. The online application type and state estimating section 134 is also one feature of this example embodiment. The details of its operation will be described in the following description of the operation.

(8) Communication Traffic Control Section 135

The communication traffic control section 135 controls communication traffic by using, for example, the results of analyzing communication traffic. For example, the communication traffic control section 135 performs communication control for the network based on the type and state of the application estimated by the online application type and state estimating section 134. The communication traffic control section 135 may directly perform this communication control and the like, or transmit commands for communication control to network nodes (L3 switch (Layer 3 switch), base station, gateway, etc.).

(9) Implementation Example

The network communication section 110 may be implemented by a network adapter, a network interface card, and/or the like. The storage section 120 may be implemented by a memory (for example, a non-volatile memory and/or a volatile memory), a hard disk, and/or the like. The processing section 130 may be implemented by a processor or the like. Some or all of the communication traffic acquiring section 131, the state transition model generating section 132, the state transition model updating section 133, the online application type and state estimating section 134, and the communication traffic control section 135 may be implemented by the same processor, or may be implemented separately by different processors. The memory (the storage section 120) may be included in such a processor (chip).

The communication traffic analyzing apparatus 100 may include a memory that stores a program and one or more processors that can execute the program. One or more processors here may perform the operations of the processing section 130 (the operations of the communication traffic acquiring section 131, the state transition model generating section 132, the state transition model updating section 133, the online application type and state estimating section 134, and the communication traffic control section 135). The program may be a program to cause the processors to execute the operations of the processing section 130 (the operations of the communication traffic acquiring section 131, the state transition model generating section 132, the state transition model updating section 133, the online application type and state estimating section 134, and the communication traffic control section 135).

<4.2. Technical Features>

(1) Network Control

For the network control, the communication traffic control section 135 may control traffic shaping, filtering and so forth, according to the type and state of the application. Note that, in traffic shaping, the speed of packet transmission (transmission interval) is adjusted to keep the rate of traffic constant, by controlling, for example, reserving bandwidth, limiting bandwidth, controlling priority, and so forth. In filtering, individual network access is allowed or denied based on filtering rules, which are specified by checking the traffic.

When a network node is a base station or includes base station functions, or when a network node is implemented on mobile edge computing apparatus, radio scheduling may be carried out so that, when radio channels are allocated based on radio quality, radio channels are preferentially allocated to that mobile station (terminal) of high urgency.

Alternatively, the communication traffic analyzing apparatus 100 may be implemented as a traffic detection function (TDF) of a carrier network. In this case, the communication traffic analyzing apparatus 100 analyzes the relationship between communication traffic and the type and state of the application, and recognizes the application corresponding to the traffic, and the policy and charging rules function (PCRF) determines the control rule. Then, control such as bandwidth control and route change may be performed based on policy and the charging rules enforcement (PCEF).

Furthermore, for communication control suitable for the type and state of the application, communication timings (packet data transmission time, transmission intervals, etc.), compression coding (compression coding scheme, coding rate, frame rate, resolution, etc.) of the encoder (encoding section) (not shown) in the transmission source, relay station (transcoder), and so forth may be controlled.

(2) Process Flow

Next, example process flows according to the first example embodiment will be described.

In order to analyze communication traffic in which the type and state of an application change from time to time, on a real time basis, the present example embodiment in particular provides a function for updating the model and a function for estimating the type and state of the application online.

The operation flow can be roughly divided into two. The first one is the operation flow of the state transition model updating section 133, in which models are generated from time-series data of observed communication traffic, and updated to the latest model. The second one is the operation flow of the online application type and state estimating section 134, in which the type and state of the application is estimated online by using the latest state transition model. Hereinafter, the flows will be described in order.

(Flow 1: Model Updating Function)

With the present example embodiment, the state transition model updating section 133 updates a model by taking into account the adequacy of the timing of updating the model. The adequacy of the timing of updating a model has, for example, the following two aspects.

The first aspect is the degree of impact that the updating of models has on communication control. The simplest model updating timing is given by generating and updating models on a regular basis. However, the balance with the timing of communication control is important. For example, updating the model while communication is in progress can lead to a degradation of application quality, such as disconnection of communication. Therefore, with the present example embodiment, the model is updated at timings the degree of impact on communication control is insignificant. A specific example will be described later.

The second aspect is the degree of change of the model. When taking the degree of change of the model into account, if the difference between the previous model and the latest model is insignificant, there is no need (or little need) to update the model, and therefore the model is not updated. On the other hand, the model is updated if the degree of change of the model is significant. For the degree of change of the model, conditions may be determined in advance so that, for example, the degree of change is significant when, as a result of generating a new model, the type and state of the application and the number of states change.

Figure 3:
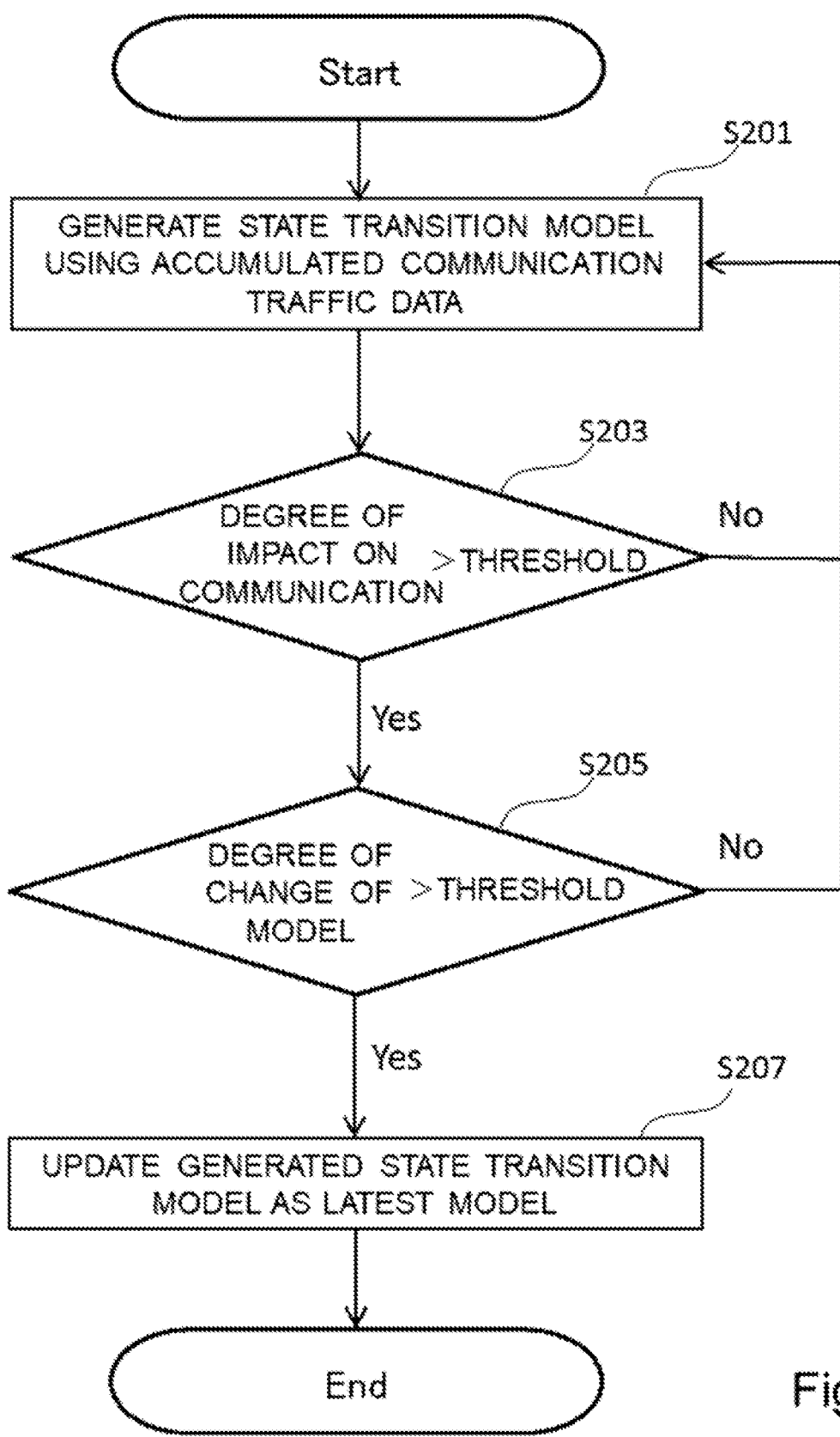
FIG. 3 is a flowchart to illustrate an example of a model updating operation flow according to the first example embodiment.

FIG. 3 is a flowchart to illustrate an example of the model updating operation flow according to the first example embodiment.

First, the processing section 130 (the state transition model generator 132) generates state transition models at predetermined timings (or periodically), from accumulated communication traffic data (S101). Next, the processing section 130 (the state transition model updating section 133) monitors the state of communication, and determines whether or not updating of the model has little impact on communication (S103). For example, when there is no communication traffic (or when there is a certain amount of, or less, communication traffic) or when the type and state of the application involved in communication has low importance, the processing section 130 (the state transition model updating section 133) determines that the impact of updating the model would be insignificant, set a model updatable flag, and moves on to the processing of step S105. On the other hand, otherwise, the processing section 130 (the state transition model updating section 133) returns to step S101, and executes the processes of step S101 and subsequent steps again at the next processing timing.

In step S105, the processing section 130 (the state transition model updating section 133) confirms that the model updatable flag is set (that is, the impact on communication is insignificant even if the model is updated), and evaluates the degree of change of the model (S105). The degree of change of the model is the difference between the state transition model generated in step S101 and the existing state transition model (for example, the one in use). The processing section 130 (the state transition model updating section 133) updates the model when the degree of change is greater than a predetermined scale (for example, a threshold) (S107). To be more specific, the processing section 130 (the state transition model updating section 133) replaces the state transition model in use with the state transition model generated in step S101.

(Real-Time Estimation of Type and State of Application)

Figure 4:
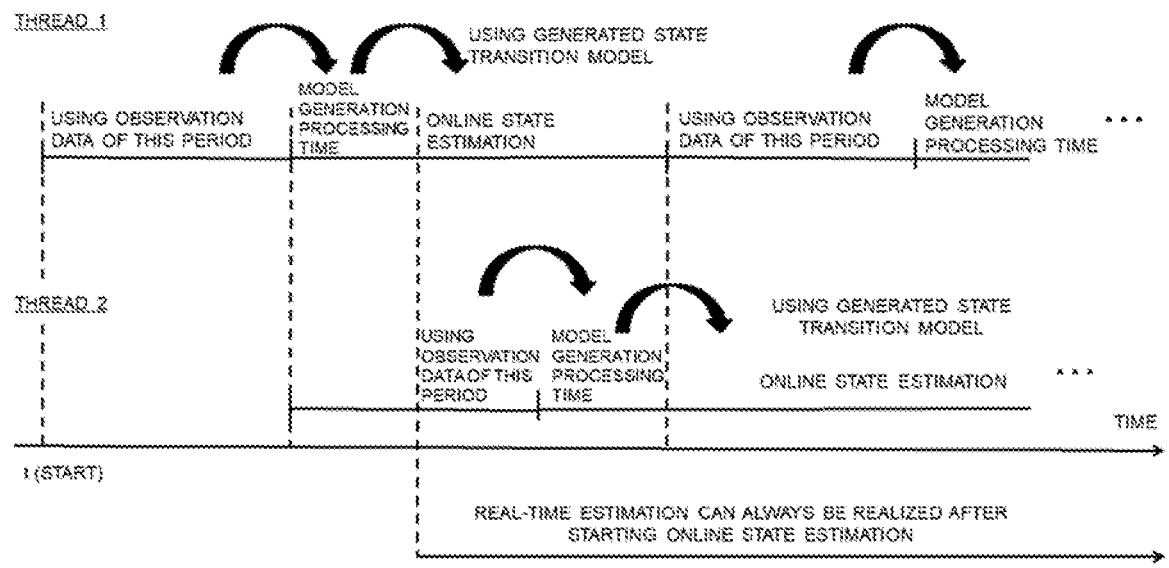
FIG. 4 is a diagram to explain real-time estimation of the type and state of an application using two threads according to the present example embodiment.

Next, real-time estimation of the type and state of an application will be described. FIG. 4 is a diagram to explain real-time estimation of the type and state of an application using two threads according to the present example embodiment.

For example, as shown in FIG. 4, two threads are prepared and only thread 1 (first thread) operates at the analysis-starting timing. In thread 1, a model starts being generated using observation data for a predetermined length of period. As soon as a model has been generated, the type and state of the application is estimated online, using the generated model.

Also, thread 2 (second thread) is started from the model generation starting timing in thread 1. In thread 2, observation data for a predetermined length of period is accumulated during the operation of thread 1, and a model is generated. After that, the online estimation in thread 1 is stopped, and online estimation is performed in thread 2. For example, online estimation can be switched from thread 1 to thread 2 at the timing of updating the model, which has been described with reference to FIG. 3.

In this way, the state transition model generating section 132 newly generates, in the second thread, a probabilistic second state transition model from time-series data of communication traffic, while the online application type and state estimating section 134 estimates, in the first thread, the type and state of the application by using the first state transition model.

In this way, real-time estimation can always be realized by performing model updating and online estimation using two threads. However, the details of the operations of the threads are not limited to the above-described examples. A configuration in which model generation alone is performed in thread 1 and online estimation alone is performed in thread 2 may be employed. Also, the number of threads is not limited to two, and may be three or more.

As described above, according to the present example embodiment, the communication traffic acquiring section 131 monitors the state of communication, and sets a model updatable flag when there is no communication traffic or when the type and state of the application involved in communication has low importance. While the model updatable flag is set, the degree of change of the model is calculated, and the model is updated if the degree of change of the model is significant. As described above, by performing model updating at an appropriate timing, it is possible to estimate the type and state of an application more accurately.

(Flow 2: Online Estimation of Type and State of Application)

The online application type and state estimating section 134 estimates the type and state of an application from observed communication traffic, using the latest model. An example of the method for estimating the type and state of an application will be shown below.

First, the processing section 130 (the state transition model generating section 132) defines the parameters. In the text of the present example embodiment, an application's type and state will be simply referred to as "state". N is the number of states, $o_t$ is d-dimensional observation data at time t, and $s_t$ is the state at time t. The model parameters for an n-layer probabilistic state transition model at this time are defined as follows:

[Math. 1]

$$\lambda^n = \left(a\frac{n}{ij}, b\frac{n}{j}(o_t), \pi\frac{n}{j}, p\frac{n}{i}(d)\right)$$

Here, $a_{ij}$ is the probability of transition from state i to j, $b_i(o_t)$ is the probability that $o_t$ is observed in state i, $\pi_i$ is the probability that the state is i at time t=0, $p_i(\tau)$ is the probability that state i will last for $\tau$ hours.

First, in online application estimation, the processing section 130 (the online application type and state estimating section 134) calculates a state estimation value for the state transition model of the first layer. To calculate the state estimation value, the processing section 130 calculates probability $\alpha_t^1(i)$ that the state is i at present time t, based on the following equation 1. In addition, although 1 and t in $a_t^1(i)$ are in the same column side by side, these will be described as shown on the left for the convenience of input. The same applies to the notation of other parameters:

[Math. 2]

$$\alpha\frac{1}{t}(i) = Pr\left[s\frac{1}{t} = i | o_t, \lambda^1\right] = \left(\sum_{j=1}^{N} \alpha\frac{1}{t-1}(j)a\frac{1}{ji}\right)b\frac{1}{i}(o_t) \quad (1)$$

Next, the processing section 130 (the online application type and state estimating section 134) calculates a state estimation value based on the following equation 2:

[Math. 3]

$$s\frac{1}{t} = \underset{i}{\mathrm{argmax}}\,\alpha\frac{1}{t}(i) \quad (2)$$

The estimation result from above equation 2 is the state estimation value for the state transition model of the first layer. For the second and subsequent layers, the processing section 130 (the online application type and state estimating section 134) can calculate state estimation values using equation 1 and equation 2, as with the first layer, by substituting of in equation 1 with the state estimation value $s_t^{\wedge(n-1)}$ of the n−1-th layer. The processing section 130 (the online application type and state estimating section 134) repeats the calculation up to the n-th layer.

From the above, it is possible to estimate the type and state of an application on a real time basis, based on time-series data of observed communication traffic, while keeping the state transition model up-to-date, by executing flow 1 and flow 2 in parallel.

<4.3. Summary>

The first example embodiment has been described above. According to the first example embodiment, it is possible to realize real-time estimation when estimating the type and state of an application from time-series data of communication traffic. In addition, the type and state of an application that change from time to time are tracked on a real time basis, so that communication control to satisfy the quality of the application is realized.

5. SECOND EXAMPLE EMBODIMENT

Figure 5:
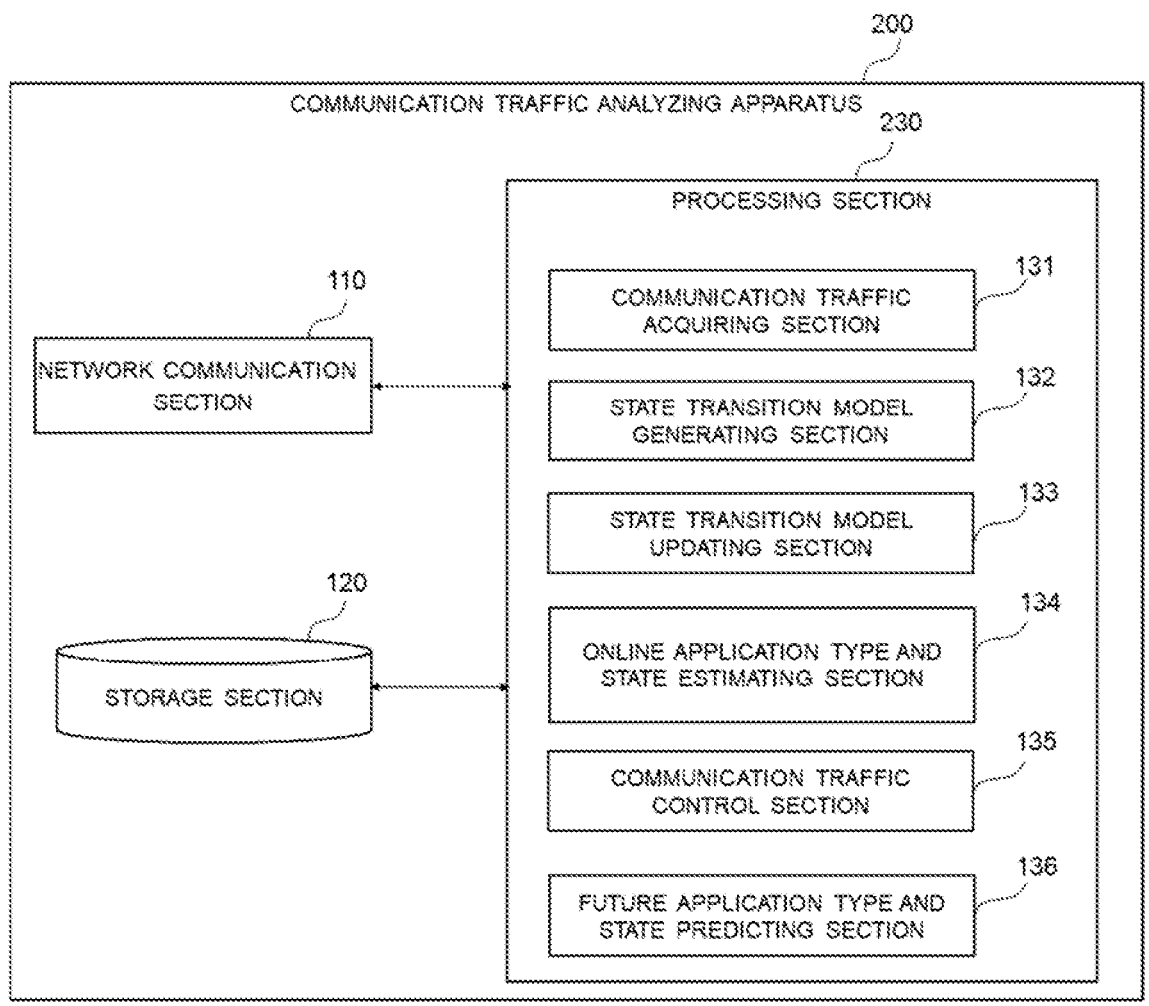
FIG. 5 is a block diagram to show an example configuration of communication traffic analyzing apparatus according to a second example embodiment.

Next, a second example embodiment of the present invention will be described below with reference to FIG. 5 to FIG. 7.

<5.1. Configuration of Communication Traffic Analyzing Apparatus>

First, an example configuration of communication traffic analyzing apparatus 200 according to a second example embodiment will be described below with reference to FIG. 5. FIG. 5 is a block diagram to show an example configuration of the communication traffic analyzing apparatus 200 according to the second example embodiment. Referring to FIG. 5, the communication traffic analyzing apparatus 200 includes a future application type and state predicting section 136, in the processing section 230, in addition to the communication traffic analyzing apparatus 100 of the first example embodiment.

(1) Future Application Type and State Predicting Section 136

The future application type and state predicting section 136 predicts the future transition patterns of application type and state by using time-series data of observed communication traffic and state transition model parameters.

The other configurations are the same as the configurations of the above-described first example embodiment, and thus the description thereof will be omitted.

<5.2. Technical Features>

One example object of future prediction according to the present example embodiment is to make it possible to prepare for communication control in advance by calculating future patterns of change of the type and state of an application.

When future predictions are made by using probabilistic state transition models, the phenomenon in which the predicted state switches frequently might occur. Therefore, when the predicted application type and state switch frequently, the predicted application type and state have no meaning in communication control.

So, with the present example embodiment, a method of predicting transition patterns of the type and state of an application that are long ahead by using probabilistic state transition models will be described. Note that, in the text of the present example embodiment, an application's type and state will be simply referred to as "state".

There are, for example, two main aspects to this prediction method. The first one is to calculate which state will occur, with what probability, from the present time to T periods ahead (for example, T seconds ahead) where future prediction is wanted (hereinafter referred to as "forward probability calculation phase"). The second aspect is to select a state of high probability from T periods ahead, and calculates a state transition pattern (hereinafter referred to as "backward state transition pattern calculation phase").

First, as for the parameters, the same parameters as those used in the first example embodiment will be used. Also, for prediction, the time the state will stay after the state changed last, up to time t, is set to $\tau_t(i)$. Furthermore, what needs to be predicted this time is the transition pattern of type and state of an application, only the state transition model of the n-th layer will be focused on.

(Forward Probability Calculation Phase)

For parameters for storing probability, probability $\alpha_t(i,j)$ that the state is i at time t−1 and that the state is j at time t when state transition model $\lambda$ is given, is defined as follows:

$$\alpha_t(i,j) \triangleq Pr[s(t-1)=i, s(t)=j|\lambda] \quad \text{[Math. 4]}$$

At this time, the probability of state transition at time t can be calculated based on following equation 3:

[Math. 5]

$$\alpha_t(i,j) = \alpha_{t-\tau(i)}(i) p_i(\tau(i)) a_{i,j} (i \neq j, t_c \leq t \leq t_c+T) \quad (3)$$

Also, the probability that the state is maintained at time t can be calculated based on following equation 4:

[Math. 6]

$$\alpha_t(i,j) = \alpha_{t-\tau(i)}(i)(1-p_j(t-\tau(i)))(i=j, t_c \leq t \leq t_c+T) \quad (4)$$

In other words, the future application type and state predicting section 136 calculates the state probability in future directions, by utilizing a past probabilistic state transition pattern (for example, $\alpha_{t-\tau}(i)$ in the above equation) and a probabilistic distribution of state duration (for example, $p_j$ in the above equation), and by using state transition models.

Therefore, the probability that the state is i at time t that is defined based on following equation 5 can be calculated based on following equation 6:

[Math. 7]

$$\alpha_t(i) \triangleq Pr[s(t)=i|\lambda] \quad (5)$$

$$\alpha_t(i) = \max \alpha_t(i,j) \quad (6)$$

In addition, the state at time t−1 when the state is state i at time t can be calculated based on the following equation:

[Math. 8]

$$\beta_t(i) = \underset{j}{\operatorname{argmax}} \alpha_t(i, j)$$

Figure 6:
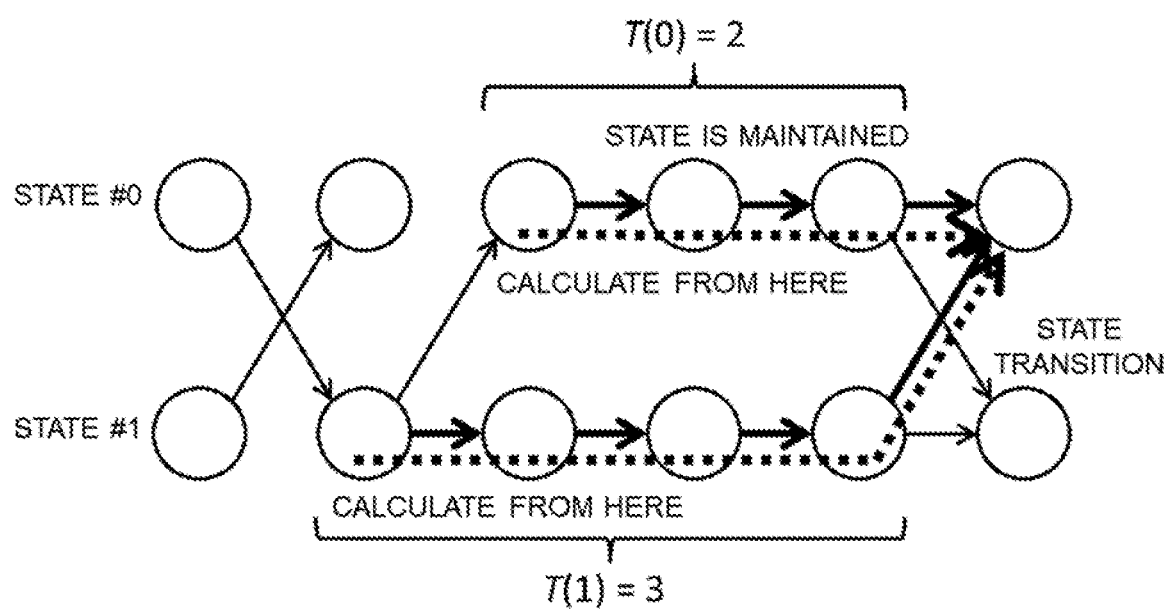
FIG. 6 is a diagram to explain a forward probability calculation phase.

FIG. 6 is a diagram to explain a forward probability calculation phase. One of the main aspects of the forward probability calculation phase is the point of starting probability calculation. The processing section 230 (future application type and state predicting section 136), when calculating the probability at a given time, calculates the probability from the time at which the latest state transition occurred, using above equation 3 and equation 4. The processing section 230 (the future application type and state predicting section 136) sequentially calculates the probability that the state at future times is i (or j), using above equation 3 and equation 4. The processing section 230 (the future application type and state predicting section 136) stores the calculated probability in the storage section 120 in association with times and states.

(Backward state transition pattern calculation phase) In the backward state transition pattern calculation phase, what state is selected from future time $t_{c+T}$ towards current time $t_c$ is calculated based on following equation 7:

[Math. 9]

$$s(t_c + T) = \underset{i}{\operatorname{argmax}} \alpha_{t_c+T}(i) \quad (7)$$

In other words, the future application type and state predicting section 136 calculates what state will be selected in the direction from the future towards the current, and predicts the pattern of change of the application state up to a predetermined future timing.

Figure 7:
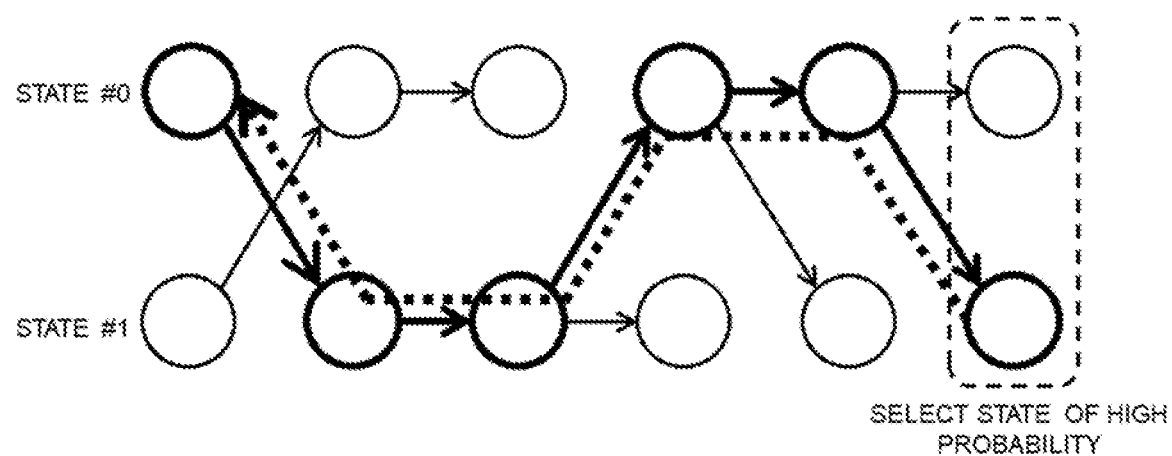
FIG. 7 is a diagram to explain a backward state transition pattern calculation phase.

FIG. 7 is a diagram to explain a backward state transition pattern calculation phase. The processing section 230 (the future application type and state predicting section 136) selects a state in which the value of forward probability is large, at time $t_{c+T}$. These probability and state are stored in the storage section 120 in the forward probability calculation phase described above. After that, the processing section 230 (future application type and state predicting section 136) can acquire a state transition pattern backward, by selecting a state with a high probability, in the direction towards present time G.

From the above, a predicted value of the state transition pattern is uniquely determined. The processing section 230

(the future application type and state predicting section 136) may display the predicted state transition pattern and an intermediate result, or output these to external apparatus as appropriate. In addition, the processing section 230 (the communication traffic control section 135) may control communication using the predicted state transition pattern.

<5.3. Summary>

The second example embodiment has been described above. According to the second example embodiment, it is possible to realize real-time estimation when estimating the type and state of an application from time-series data of communication traffic. Also, according to the second example embodiment, it is possible to calculate future patterns of change of the type and state of an application in advance.

6. THIRD EXAMPLE EMBODIMENT

Figure 8:
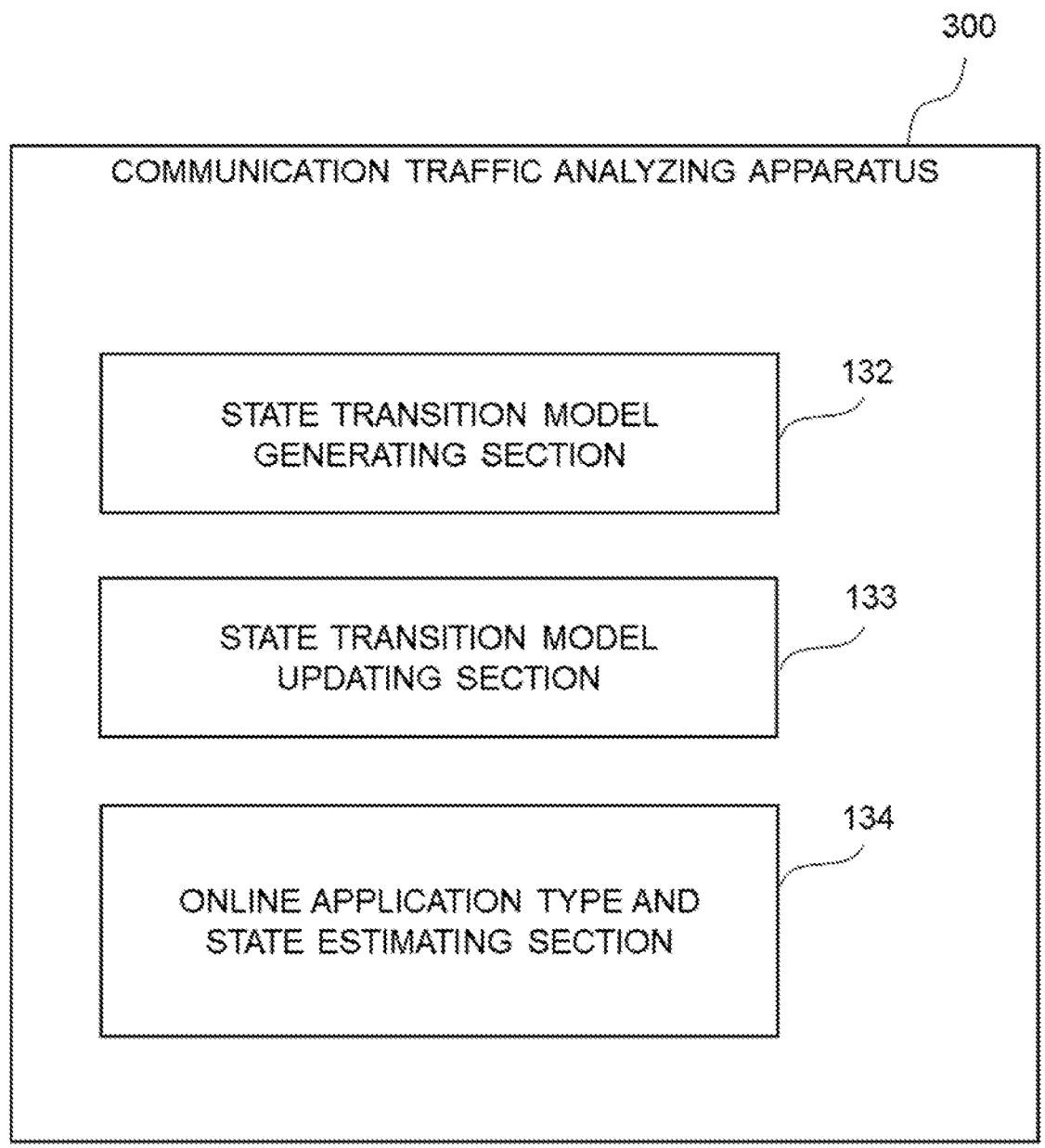
FIG. 8 is a block diagram to show an example configuration of communication traffic analyzing apparatus according to a third example embodiment.

Next, a third example embodiment of the present invention will be described below with reference to FIG. 8. Although the first and the second example embodiments described above are specific example embodiments, the third example embodiment is a more generalized example embodiment.

<6.1. Configuration of Communication Traffic Analyzing Apparatus>

First, an example configuration of the communication traffic analyzing apparatus 300 according to the third example embodiment will be described below with reference to FIG. 8. FIG. 8 is a block diagram to show an example configuration of communication traffic analyzing apparatus 300 according to the third example embodiment. Referring to FIG. 8, the communication traffic analyzing apparatus 300 includes a state transition model generating section 332, a state transition model updating section 333, and an online application type and state estimating section 334.

(1) State Transition Model Generating Section 332

The state transition model generating section 332 generates state transition models for probabilistically estimating the type and state of an application from the variation of the waveform of time-series data of communication traffic. For example, the state transition model generating section 332 generates probabilistic state transition models, from time-series data of communication traffic, per predetermined timing. As for the method of generating state transition models, a known method can be used.

(2) State Transition Model Updating Section 333

The state transition model updating section 333 determines the timing for updating the parameters of the state transition models for use in the online estimation type and the state estimation section 334. Note that the parameters of the state transition models are generated in the state transition model generating section 332. For example, if the difference between state transition models generated by the state transition model generating section 332 with respect to two timings is greater than or equal to a predetermined difference and the communication state of the network satisfies a predetermined condition (for example, having little impact on communication control), the state transition model updating section 333 updates one state transition model corresponding to the older timing with the other state transition model corresponding to the newer timing.

(3) Online Application Type and State Estimating Section 334

The online application type and state estimating section 334 analyzes observed communication traffic on a real time basis, and estimates the type and state of the application at observed timings. For example, the online application type and state estimating section 334 estimates the type and state of an application by using the state transition model updated in the state transition model updating section 333.

(4) Implementation Example

Some or all of the state transition model generating section 332, the state transition model updating section 333, and the online application type and state estimating section 334 may be implemented by the same processor, or may be implemented separately by different processors. The memory (the storage section 220) may be included in such a processor (chip).

The communication traffic analyzing apparatus 100 may include a memory that stores a program and one or more processors that can execute the program. One or more processors here may perform the operations of the processing section 130 (the operations of the state transition model generating section 332, the state transition model updating section 333, and the online application type and state estimating section 334). The program may be a program to cause a processor to execute the operations of the processing section 130 (the operations of the state transition model generating section 332, the state transition model updating section 333, and the online application type and state estimating section 334).

<6.2. Technical Features>

The process flow according to the third example embodiment is the same as the description of these in the first example embodiment. Therefore, overlapping description will be omitted here.

<6.3. Summary>

The third example embodiment has been described above. According to the third example embodiment, it is possible to realize real-time estimation when estimating the type and state of an application from time-series data of communication traffic.

7. EXAMPLE ALTERATION OF EACH EXAMPLE EMBODIMENT

Next, referring to FIG. 9, an example alteration of each of the above-described example embodiments will be described. FIG. 9 are diagrams to explain examples of schematic configurations of the systems 2 and 3 according to example embodiments of the present invention.

With each of the above-described example embodiments, an example has been described in which the communication traffic analyzing apparatus 100 is implemented as different apparatus from the packet capture 10, as shown in FIG. 1.

Figure 9A:
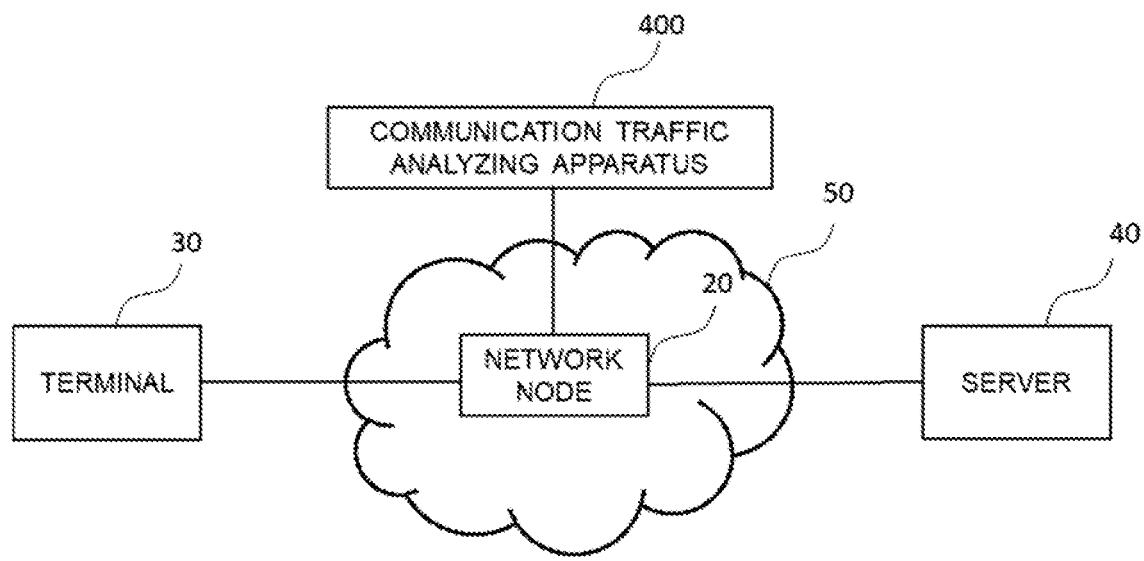
FIGS. 9a and 9b are diagrams to explain example schematic configurations of a systems according to each example embodiment of the present invention.
Figure 9B:
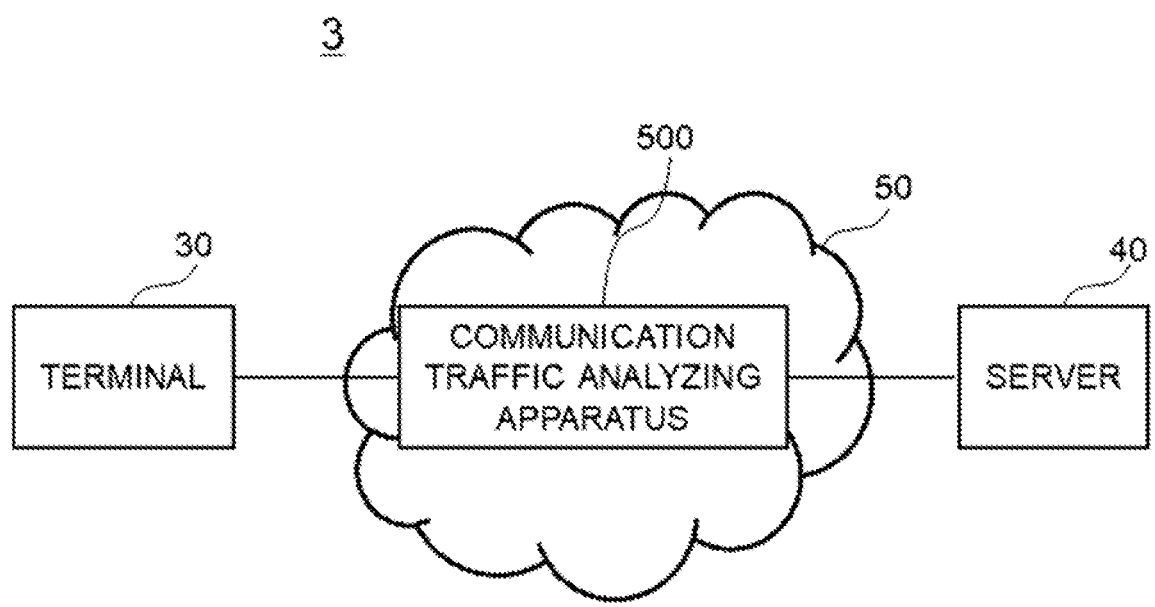

As shown in FIG. 9(a), a configuration, in which the packet capture 10 of FIG. 1 is implemented in communication traffic analyzing apparatus, and in which the packet capture 10 and the communication traffic analyzing apparatus are implemented as one entity (communication traffic analyzing apparatus 400) may be employed. In addition, as shown in FIG. 9(b), a configuration in which the packet capture and the communication traffic analyzing apparatus are integrally implemented as one entity with nodes (for example, a relay device such as a router, a wireless base station, a mobile edge computing (MEC) server, a gateway or a server on the core network, etc.) of the communication network 50 (communication traffic analyzing apparatus 500) may be employed. Also, a configuration in which the communication traffic analyzing apparatus is implemented inside the terminal apparatus 30 may be employed.

8. OTHER EXAMPLE EMBODIMENTS

Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.

Also, apparatus to have the components (for example, the state transition model generating section, the state transition model updating section and/or the application type and state estimating section, etc.) of the communication traffic analyzing apparatus (for example, module for communication traffic analyzing apparatus) described in the Specification may also be provided. Furthermore, a method to include processes by these components may be provided, and a program to cause a processor to execute processes in these components may be provided. Also, a non-transitory computer-readable recording medium that records this program may be provided. Obviously, such apparatus, method, program, and non-transitory computer-readable recording medium are included in the present invention.

Some of or all of the example embodiments can be described as in the following supplementary notes, but are not limited to the following.

(Supplementary Note 1)

A communication traffic analyzing apparatus comprising:

a state transition model generating unit configured to generate a probabilistic state transition model from time series data of communication traffic, at each predetermined timing;

a state transition model update unit configured to update a state transition model when a difference between the state transition models at two timings generated by the state transition model generating unit is greater than or equal to a predetermined difference and a communication state of network satisfies a predetermined condition; and an application type and state estimating unit configured to estimate a type and a state of an application using the updated state transition model.

(Supplementary Note 2)

The communication traffic analyzing apparatus according to Supplementary Note 1, wherein the state transition model generating unit is configured to newly generate, in a second thread, a probabilistic second state transition model from time series data of communication traffic while the application type and state estimating unit estimates, in a first thread, a type and a state of an application using a first state transition model.

(Supplementary Note 3)

The communication traffic analyzing apparatus according to Supplementary Note 1 or 2, further comprising a communication traffic control unit configured to perform communication control of network based on the type and state of the application estimated by the application type and state estimating unit.

(Supplementary Note 4)

The communication traffic analyzing apparatus according to any one of Supplementary Notes 1 to 3, further comprising a future application state change predicting unit configured to calculate a state probability in a future direction utilizing a past probabilistic state transition pattern and probabilistic distribution of state duration using the state transition model and to calculate what state is to be selected in a direction from future to current to predict a variation pattern of an application state up to a future predetermined timing.

(Supplementary Note 5)

A communication traffic analyzing method comprising:

generating a probabilistic state transition model from time series data of communication traffic, at each predetermined timing;

updating a state transition model when a difference between the generated state transition models at two timings is greater than or equal to a predetermined difference and a communication state of network satisfies a predetermined condition; and estimating a type and a state of an application using the updated state transition model.

(Supplementary Note 6)

The communication traffic analyzing method according to Supplementary Note 5, comprising newly generating, in a second thread, a probabilistic second state transition model from time series data of communication traffic while estimating, in a first thread, a type and a state of an application using a first state transition model.

(Supplementary Note 7)

The communication traffic analyzing method according to Supplementary Note 6, further comprising performing communication control of network based on the estimated type and state of the application.

(Supplementary Note 8)

The communication traffic analyzing method according to any one of Supplementary Notes 5 to 7, further comprising calculating a state probability in a future direction utilizing a past probabilistic state transition pattern and probabilistic distribution of state duration using the state transition model and calculating what state is to be selected in a direction from future to current to predict a variation pattern of an application state up to a future predetermined timing.

(Supplementary Note 9)

A program that cause a processor to:

generate a probabilistic state transition model from time series data of communication traffic, at each predetermined timing;

update a state transition model when a difference between the generated state transition models at two timings is greater than or equal to a predetermined difference and a communication state of network satisfies a predetermined condition; and estimate a type and a state of an application using the updated state transition model.

(Supplementary Note 10)

Anon-transitory computer readable recording medium storing a program that causes a processor to:

generate a probabilistic state transition model from time series data of communication traffic, at each predetermined timing;

update a state transition model when a difference between the generated state transition models at two timings is greater than or equal to a predetermined difference and a communication state of network satisfies a predetermined condition; and estimate a type and a state of an application using the updated state transition model.

This application claims the priority on the basis of Japanese Patent Application No. 2018-063598, filed on Mar. 29, 2018, and the disclosure including the specification, drawings and abstract, is incorporated herein by reference in its entirety.

INDUSTRIAL APPLICABILITY

It is an example object of the present invention to realize real-time estimation when estimating the type and state of an application from time-series data of communication traffic.

REFERENCE SIGNS LIST 1, 2, 3, 4 System
10 Packet capture
20 Network node
30 Terminal apparatus
40 Server
50 Communication network
100, 200, 300, 400, 500 Communication traffic analyzing apparatus
130 Processing section
131 Communication traffic acquiring section
132 Transition model generating section
133 State transition model updating section
134 Online application type and state estimating section
135 Communication traffic control section
136 Future application type and state predicting section

What is claimed is:

1. A communication traffic analyzing apparatus comprising:
a memory storing instructions; and
one or more processors configured to execute the instructions to:
generate a probabilistic state transition model from time series data of communication traffic, at each predetermined timing, the probabilistic state transition model being a model for probabilistically estimating a type and a state of an application;
evaluate a degree of change between a newly generated probabilistic state transition model and a previously generated probabilistic state transition model;
update a state transition model when the degree of change is greater than or equal to a predetermined threshold and a communication state of network satisfies a predetermined condition; and
estimate the type and the state of the application using the updated state transition model, wherein
the one or more processors are further configured to execute the instructions to calculate a state probability in a future direction utilizing a past probabilistic state transition pattern and probabilistic distribution of state duration using the state transition model and to calculate what state is to be selected in a direction from future to current to predict a variation pattern of an application state up to a future predetermined timing.

2. The communication traffic analyzing apparatus according to claim 1, wherein
the one or more processors are configured to execute the instructions to newly generate, in a second thread, a probabilistic second state transition model from time series data of communication traffic while estimating, in a first thread, a type and a state of an application using a first state transition model.

3. The communication traffic analyzing apparatus according to claim 1, wherein
the one or more processors are configured to execute the instructions to further perform communication control of network based on the estimated type and state of the application.

4. A communication traffic analyzing method comprising:
generating a probabilistic state transition model from time series data of communication traffic, at each predetermined timing, the probabilistic state transition model being a model for probabilistically estimating a type and a state of an application;
evaluating a degree of change between a newly generated probabilistic state transition model and a previously generated probabilistic state transition model;
updating a state transition model when the degree of change is greater than or equal to a predetermined threshold and a communication state of network satisfies a predetermined condition; and
estimating the type and the state of the application using the updated state transition model,
wherein the method further comprises calculating a state probability in a future direction utilizing a past probabilistic state transition pattern and probabilistic distribution of state duration using the state transition model and calculating what state is to be selected in a direction from future to current to predict a variation pattern of an application state up to a future predetermined timing.

5. The communication traffic analyzing method according to claim 4, comprising newly generating, in a second thread, a probabilistic second state transition model from time series data of communication traffic while estimating, in a first thread, a type and a state of an application using a first state transition model.

6. The communication traffic analyzing method according to claim 5, further comprising performing communication control of network based on the estimated type and state of the application.

7. The communication traffic analyzing method according to claim 4, further comprising calculating a state probability in a future direction utilizing a past probabilistic state transition pattern and probabilistic distribution of state duration using the state transition model and calculating what state is to be selected in a direction from future to current to predict a variation pattern of an application state up to a future predetermined timing.

8. A non-transitory computer readable recording medium storing a program that causes a processor to:
generate a probabilistic state transition model from time series data of communication traffic, at each predetermined timing, the probabilistic state transition model being a model for probabilistically estimating a type and a state of an application;
evaluating a degree of change between a newly generated probabilistic state transition model and a previously generated probabilistic state transition model;
update a state transition model when the degree of change is greater than or equal to a predetermined threshold and a communication state of network satisfies a predetermined condition; and
estimate the type and the state of the application using the updated state transition model,
wherein the program further causes the processor to calculate a state probability in a future direction utilizing a past probabilistic state transition pattern and probabilistic distribution of state duration using the state transition model and to calculate what state is to be selected in a direction from future to current to predict a variation pattern of an application state up to a future predetermined timing.

* * * * *